(No Model.)  2 Sheets—Sheet 1.
J. MILLER, Dec'd.
L. & R. A. MILLER, Administrators.
SHEAF CARRIER FOR BINDING AND HARVESTING MACHINES.
No. 521,292. Patented June 12, 1894.
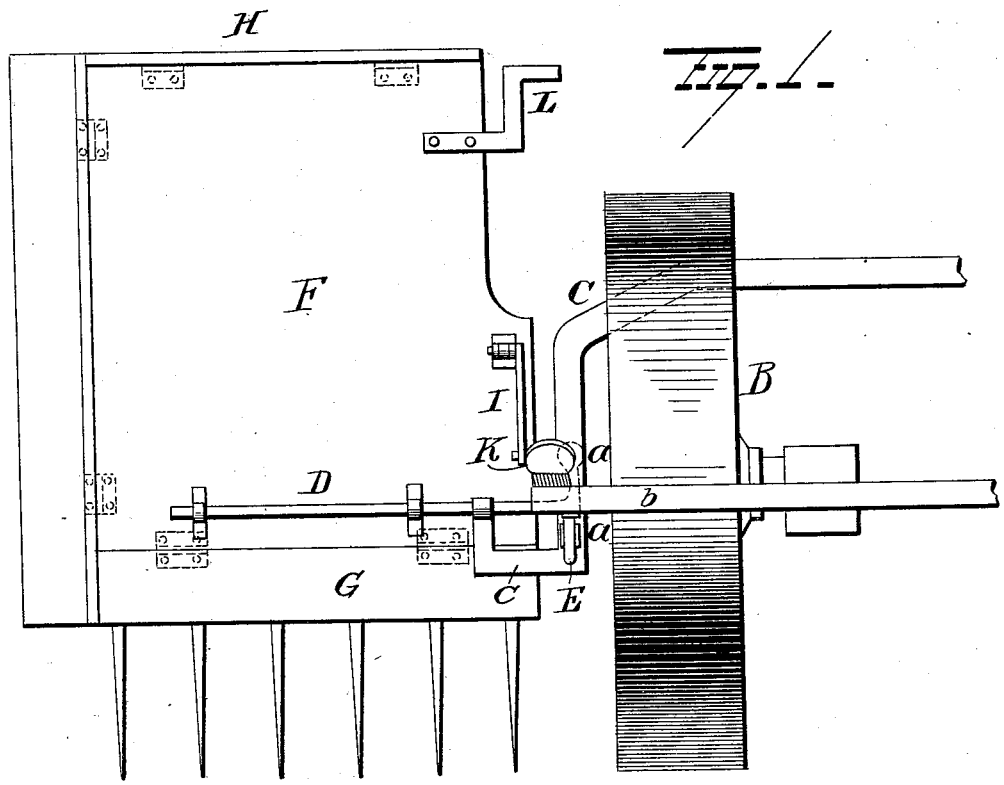

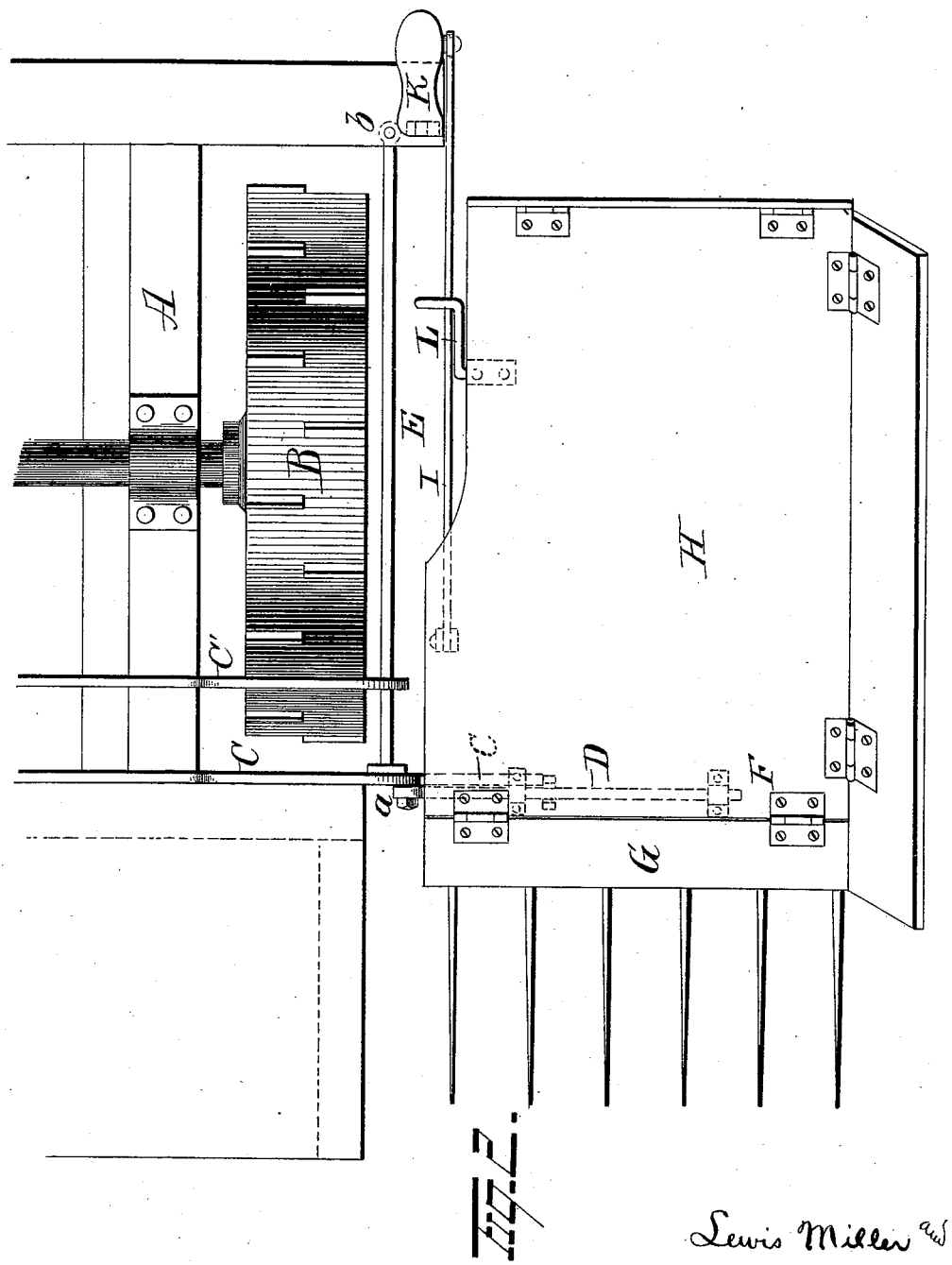

UNITED STATES PATENT OFFICE.

LEWIS MILLER, OF AKRON, AND ROBERT A. MILLER, OF CANTON, OHIO, ADMINISTRATORS OF THE ESTATE OF JACOB MILLER, DECEASED.

SHEAF-CARRIER FOR BINDING AND HARVESTING MACHINES.

SPECIFICATION forming part of Letters Patent No. 521,292, dated June 12, 1894.

Original application filed October 21, 1884, Serial No. 144,557. Divided and this application filed December 20, 1892. Serial No. 455,770. (No model.)

*To all whom it may concern:*

Be it known that JACOB MILLER, deceased, late of Canton, in the county of Stark and State of Ohio, (LEWIS MILLER, of Akron, and ROBERT A. MILLER, of Canton, Ohio, administrators of the said JACOB MILLER,) did invent certain new and useful Improvements in Sheaf-Carriers for Binding and Harvesting Machines; and the following is hereby declared to be a full, clear, and exact description of the invention, such as will enable others skilled in the art to which it appertains to make and use the same.

This invention relates to improvements in sheaf carriers for harvesting and binding machines and is a division or continuation of application, Serial No. 144,557, filed by Jacob Miller, October 21, 1884.

The object of this invention is to provide a simple and effective means for holding the sheaves or bundles of grain after they have left the binding mechanism until a number of them have accumulated in the carrier and in providing means for the speedy removal of the sheaves from the carrier.

This invention consists in the parts and combinations of parts more fully described and pointed out in the claims.

In the accompanying drawings Figure 1 is a front view of a portion of a harvesting machine showing the sheaf carrier tilted and Fig. 2 is a top or plan view showing the carrier in position for receiving the grain from the binding mechanism.

A is the frame work and B one of the wheels of an ordinary harvesting and binding machine.

C is a bar secured to the frame of the machine to which is pivoted one end of the carrier supporting bar D as shown at *a*. The bar or sheaf carrier support C projects downwardly and outwardly from the side of the machine and the outer end of same is turned upward and forked so as to form a rest or support for the bar D and the sheaf carrier pivoted thereon.

E is a brace rod, one end of which is secured to the bar C while the other or forward end is secured to the frame of the machine as shown at *b*. The main supporting bar C may be secured to the frame of the machine farther forward, so as to pass upward over the driving wheel as shown at C' and may be braced or supported in any suitable manner.

F is the sheaf carrier which consists of a rectangular box having the side and one end hinged to the bottom board in such a manner that they can be folded down on each other so as to occupy but little space.

The section G of the carrier is hinged to the rear open end of the rectangular box or section H in such a manner that when the section H is tilted and turns on its supporting rod D, the section G will drag on the ground and the sheaves will be drawn from the carrier by coming in contact with the ground or stubble.

I is a rod, the rear end of which is pivotally connected to the under side of the section H while the front end is pivoted to the foot lever K, said foot lever being hinged to the frame of the machine and within easy reach of the driver or operator. The carrier is so arranged with relation to the binding mechanism, that the sheaves are thrown into it by the well known devices used for throwing the sheaves from the machine, the sheaves lying well back in the carrier with the heads or heavy ends of the sheaves on the section G so that when the carrier is loaded, the weight of the grain will tip the carrier the moment the operator lifts his foot from the foot lever K; and, as before stated, the impingement of the sheaves against the ground and stubble quickly frees the carrier of the sheaves. To right the carrier or place it in position to receive a new supply of sheaves the operator simply depresses the foot lever K.

L is an arm secured to the under side of the section H, which when the carrier is in a horizontal position rests on the bar I and supports section H.

Having fully described the invention, what is claimed as new, and desired to be secured by Letters Patent, is—

1. A sheaf carrier for self binding and harvesting machines, hinged on a single transverse support on the side of the machine, in combination with the rod I, connected at one end to the carrier, and at the other end to the foot lever, the said rod adapted to restore the carrier after dumping the bundles and serve as a support upon which the carrier rests when in horizontal position, as set forth.

2. In a sheaf carrier for grain binding harvesters, the combination with a harvester frame, a bundle carrier support consisting of a bar secured to said frame and projecting beyond one side thereof, and a rod or shaft pivoted to said bar upon pivots in the line of draft so as to be turned to an upright position, of a bottom board loosely journaled on said rod or shaft and end and side sections hinged to the bottom board and adapted to be folded over onto the same, the above parts being arranged to permit the carrier to be tilted to discharge its load, or folded against the side of the machine.

3. A sheaf carrier for self binding and harvesting machines supported on the side of the machine, in combination with the rod I connected at one end to the lower portion of the carrier and at the other to the foot lever, and the arm L substantially as described whereby the carrier is held in its horizontal position by the foot of the driver as set forth.

4. The supporting arm or bar C having a forked upturned end, in combination with rod D hinged thereto and the folding sheaf carrier F whereby the sheaf carrier is adapted to be turned up against the side of the machine as set forth.

In testimony whereof we have hereunto set our hands this 1st day of December, A. D. 1892.

LEWIS MILLER,
ROBERT A. MILLER,
*Administrators of the estate of Jacob Miller.*

Witnesses:
W. K. MILLER,
CHAS. R. MILLER.